United States Patent [19]
Richichi

[11] Patent Number: 5,924,650
[45] Date of Patent: *Jul. 20, 1999

[54] METHOD AND SYSTEM FOR FASTENING AIRCRAFT ASSEMBLIES

[75] Inventor: John Jeffrey Richichi, Arlington, Tex.

[73] Assignee: Northrop Grumman Corporation, Los Angeles, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/777,104

[22] Filed: Dec. 31, 1996

[51] Int. Cl.⁶ ................................. B64C 1/00; B64C 1/06
[52] U.S. Cl. ........................... 244/131; 244/123; 244/132
[58] Field of Search .................................. 244/123, 131, 244/132, 118.1

[56] References Cited

U.S. PATENT DOCUMENTS

| 1,835,338 | 12/1931 | Rossman . |
| 1,835,339 | 12/1931 | Rossman . |
| 2,565,065 | 8/1951 | Chakeres . |
| 2,881,994 | 4/1959 | Michael ............................. 244/132 X |
| 3,613,150 | 10/1971 | Osborn . |
| 3,920,206 | 11/1975 | Bigham et al. ..................... 244/123 X |
| 4,160,609 | 7/1979 | Jackson et al. . |
| 4,388,030 | 6/1983 | Skaale .............................. 244/118.1 X |
| 4,610,562 | 9/1986 | Dunn . |

*Primary Examiner*—Charles T. Jordan
*Assistant Examiner*—Charles R. Ducker, Jr.
*Attorney, Agent, or Firm*—Terry J. Anderson; Karl J. Hoch, Jr.

[57] ABSTRACT

A system for fastening aircraft assemblies is disclosed. The system comprises a first wing clip (10) having an anchor plate (12) with at least one ear (20) for affixing to a first assembly (16); a second wing clip (11) having an anchor plate (14) and at least one ear (20) for affixing to a second assembly (18); and a fastener (44) for joining the first wing clip (10) to the second wing clip (11).

27 Claims, 1 Drawing Sheet

U.S. Patent      Jul. 20, 1999      5,924,650
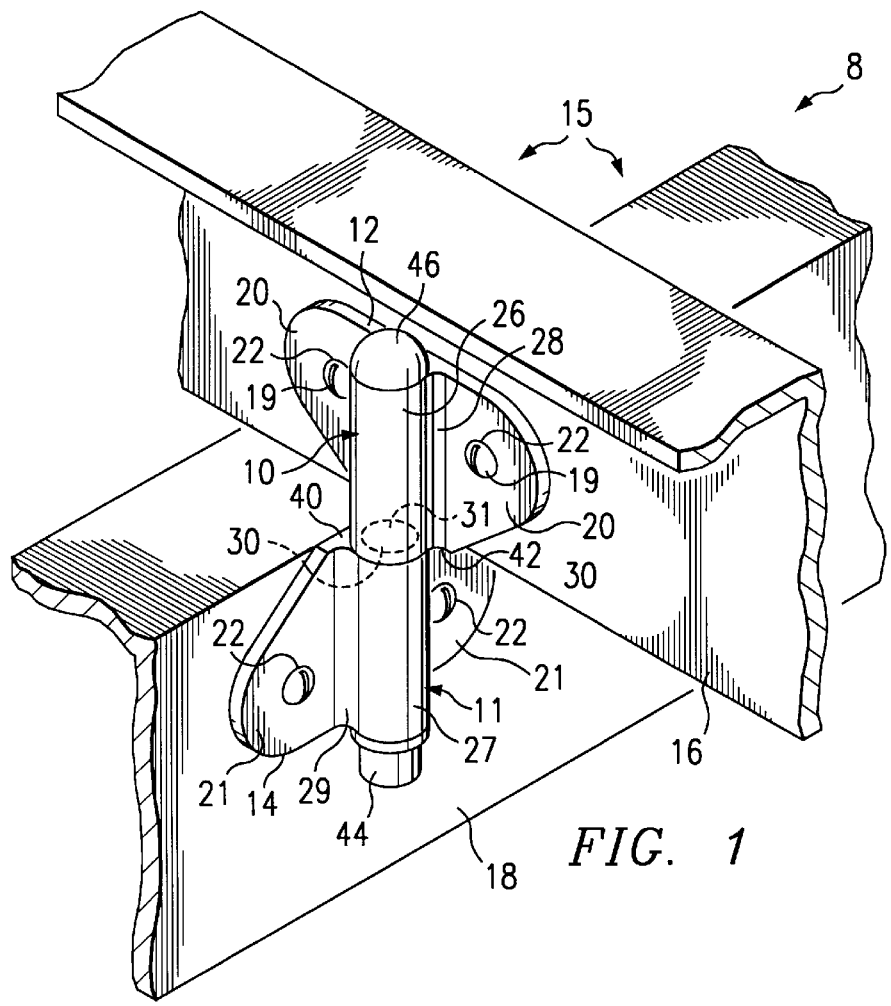
*FIG. 1*
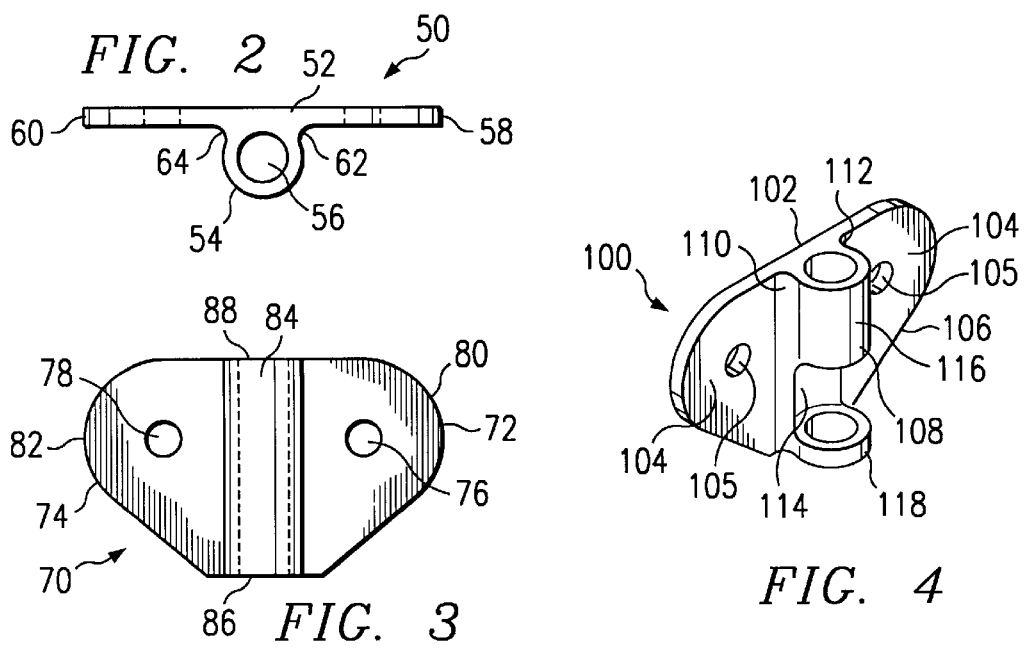
*FIG. 2*
*FIG. 3*
*FIG. 4*

METHOD AND SYSTEM FOR FASTENING AIRCRAFT ASSEMBLIES

TECHNICAL FIELD OF THE INVENTION

This invention relates generally to the field of aircraft manufacture and more particularly to a method and system for fastening aircraft assemblies.

BACKGROUND OF THE INVENTION

In the field of aircraft manufacture or assembly, an important consideration is how various assemblies or components are fastened together. Fasteners used in aircraft manufacture or assembly must meet exacting standards for strength, light weight and ease of assembly. An important assembly step in the manufacturing of an aircraft is the fastening or connection of the wing ribs to the wing skin stringers. In the typical wing assembly process, hundreds of fasteners are used. In the prior art, there are two known fastening methods for providing this connection. One approach is to drill holes through the ribs and stringers and bolt the components together using tension bolts. An alternative approach is to use a preformed butterfly clip, sometimes known as a Douglas clip, to fasten the ribs and stringers together.

Generally, a single tension bolt is inserted in complementary holes of the stringer and wing rib and then loaded primarily in tension. The butterfly clip uses a cruciform section that is machined to allow the rib and stringer to be attached to the butterfly clip with four fasteners. Both the tension bolt and the butterfly clip have significant disadvantages.

When a tension bolt is used, the parts or assemblies to be fastened together must have thicker surfaces, where the holes or drilled and the parts come together, to act as bonding pads for the bolts. This adds substantial extra weight to the overall aircraft and requires additional machining of the part. In addition, when the parts are assembled often shims must be added to meet the tight tolerances required in aircraft manufacturing. This adds substantial additional labor costs to the fastening process.

The butterfly or Douglas clips are pre-formed and must be shaped to the individual contours and angles of the assemblies being fastened together. This requires different clips for assembly at different points along the aircraft assembly. There is also a disadvantage in using the butterfly clips as even a one or two degree misalignment between the clip and the part will require shimming which adds to the complexity of the assembly process and increases labor costs. In addition, the actual manufacture of the butterfly clip is expensive since each clip has a complex cruciform shape requiring numerous different shaped parts for a single aircraft. Therefore, a need has arisen for a new method and system for fastening aircraft assemblies that overcomes the disadvantages and deficiencies of the prior art.

SUMMARY OF THE INVENTION

A system for fastening aircraft assemblies is disclosed. The system comprises a first wing clip having a first barrel for receiving a fastener and an ear for affixing to a first assembly; a second wing clip having a second barrel for receiving a fastener and an ear for affixing to a second assembly; and a fastener inserted in the first and second barrels for joining the first wing clip to the second wing clip.

In another embodiment, the method for fastening aircraft assemblies in accordance with the invention comprises three steps. Those steps are (1) fastening a first wing clip with an ear and a barrel to a first assembly; (2) fastening a second wing clip with an ear and a barrel to a second assembly; and (3) fastening the two barrels of the first and second wing clips together.

A technical advantage of the present invention is that a method for fastening aircraft assemblies is provided reducing the number of parts and complexity of aircraft assembly. Another technical advantage is that the invention provides a wing clip that is easy to manufacture and avoids the need of carrying different shaped fasteners in inventory. Another technical advantage is that a wing clip is provided that eliminates the need for using shims. Another technical advantage is that a system is provided that reduces the labor required for fastening aircraft assemblies.

BRIEF DESCRIPTION OF THE DRAWINGS

For a more complete understanding of the present invention, the objects and advantages thereof, reference is now made to the following descriptions taken in connection with the accompanying drawings in which:

FIG. 1 illustrates the system for fastening aircraft assemblies of the present invention.

FIG. 2 is a top view of a wing clip for use in the system of FIG. 1.

FIG. 3 is a front view of a wing clip for use in the system of FIG. 1.

FIG. 4 is an alternative embodiment of a wing clip for use in the system of the present invention.

DETAILED DESCRIPTION OF THE INVENTION

The preferred embodiment of the present invention and its advantages are best understood by referring to FIGS. 1 through 4 of the drawings, like numerals being used for like and corresponding parts of the various drawings.

FIG. 1 shows a system 8 in accordance with the present invention. System 8 includes a pair of wing clips 10 and 11 employed to fasten two aircraft assemblies 15 together. Aircraft assembly 15 includes a wing stringer 16 and a wing rib 18. In this embodiment, system 8 includes identical wing clips 10 and 11; however, in alternative embodiments, wing clips in accordance with the present invention may have different shapes or profiles. Wing clips 10 and 11 have anchor plates 12 and 14. Anchor plate 12 is shown fastened to a stringer 16, while anchor plate 14 is shown fastened to a rib 18. Each of the anchor plates 12 and 14 has a pair of ears 20 and 21 for direct fastening to aircraft assemblies 15. Each ear 20 of anchor plates 12 and 14 has openings 22 for receiving a bolt 19 or other type of fastener such as a screw. Ears 20 are connected to a barrel 26 at shoulder 28 of anchor plate 12. Similarly, ears 21 are connected to a barrel 27 at shoulder 29 of anchor plate 14. Wing clip 10 is connected to wing clip 11 by aligning the opening 30 of barrel 26 at mouth 40 with the opening 31 of barrel 27 at mouth 42 and inserting a bolt 44. Bolt 44 is fastened using a collar 46. Bolt 44 may be a tension bolt such as a titanium Hi-Lok bolt.

As shown in FIG. 2, a wing clip 50 can be constructed from a single piece of extruded material such as stainless steel, aluminum or other suitable material for use in the manufacture of aircraft parts. Each wing clip 50 can be sized appropriately by adjusting the thickness and shape of the anchor plate 52 for the particular load range involved in the assembly. Barrel 54 is shown with bore 56 for receiving a bolt or other fastener. Anchor plate 52 has ears 58 and 60 that are connected to barrel 54 at shoulders 62 and 64.

Referring to FIG. 3, a single wing clip 70 is shown with ears 72 and 74 having openings 76 and 78 and radiuses 80 and 82. Barrel 84 is shown with mouth 86 and tail 88. Mouth 86 is flat with an opening to mate with a complimentary mouth and opening of another wing clip. Openings 76 and 78 can be punched or drilled and sized to an appropriate dimension for the intended fastener. In an alternative embodiment, openings 76 and 78 can be omitted leaving ears 72 and 74 blank or dimpled (not shown) to provide a starting point for attaching an appropriate screw.

An alternative wing clip 100 is shown in FIG. 4. Wing clip 100 has an anchor plate 102 formed of two ears 104 and 106 connected to a barrel 108 at shoulders 110 and 112. Each of the ears 104 and 106 has openings 105. In this embodiment barrel 108 has a channel 114 milled out at over a portion of its length. In this embodiment, barrel 108 has upper barrel 116 and bolt stop 118 positioned below channel 114. By providing channel 114 in barrel 108, a lower total weight can be achieved without any loss of performance.

The wing clips of the present invention are constructed from a single rectangular piece of extruded material which is then cut into the appropriate lengths using a saw on other suitable machine to produce a blank. Ears with a suitable radius are shaped from the blank using a profile milling machine. The edges are deburred as is well known to those skilled in the art. Subsequently, the wing clips may then be anodized, primed and painted, as required by the particular application.

Referring back to FIG. 1, in the preferred embodiment, the wing clips 10 and 11 are first bolted together using tension bolt 44 before being fastened to aircraft assemblies 15. After wing clips 10 and 11 have been bolted together at the approximate angle that aircraft assemblies 15 will be fixed to one another, the wing stringer 16 and wing rib 18, which make up aircraft assembly 15, are brought together. Wing clips 10 and 11 are then placed against aircraft assemblies 15 and temporarily held in place to allow for drilling holes into the stringer 16 and rib 18 to receive fasteners such as a tension bolt, screw or other suitable fastener. While tension bolt 44 holding wing clips 10 and 11 together may be fully tightened using collar 46 there is generally enough freedom of motion in the parts to allow for an exact alignment. Holes are then drilled into assemblies 15 to align with the openings 22 in the wing clips 10 and 11. The wing clips 10 and 11 are removed and the holes in aircraft assemblies 15 are deburred. The wing clips 10 and 11 are then repositioned on the aircraft assemblies 15 and fastened into place.

Still referring back to FIG. 1, the aircraft assemblies are fastened using the wing clips of the present invention by first fastening a wing clip 10 to stringer 16 by a screw 19 or using a bolt, rivet or other suitable fastener through openings 22. The procedure is repeated with respect to rib 18 using wing clip 11. Once the wing clips have been fastened to the stringer 16 and rib 18, the barrels 26 and 27 are aligned at months 40 and 42, then a tension bolt 44 is inserted through the opening of both barrels 26 and 27 and fastened using collar 46.

While the invention has been particularly shown and described by the foregoing detailed description, it will be understood by those skilled in the art that various other changes in form and detail may be made without departing from the spirit and scope of the invention.

What is claimed is:

1. A method for fastening aircraft assemblies comprising:
   a. Aligning a first wing clip having a single barrel and first and second ears to a second wing clip having a single barrel, wherein the first and second ears are disposed in substantially the same plane on opposite sides of the first barrel of the first wing clip;
   b. Inserting a fastener through the barrels of the first and second wing clips;
   c. Fastening the first and second wing clips together with the fastener;
   d. Fastening the first wing clip to a first assembly; and
   e. Fastening the second wing clip to a second assembly.

2. The method of claim 1 wherein the second wing clip has first and second ears disposed in substantially the same plane on opposite sides of the barrel of the second wing clip for fastening to the assemblies.

3. The method of claim 1 wherein the barrels of the first and second wing clips are bored for receiving a bolt.

4. The method of claim 1 wherein the first and second ears have openings for receiving a fastener.

5. The method of claim 1 wherein the wing clips are bolted together.

6. The method of claim 1 wherein the first and second ears are shaped to a predetermined radius.

7. A system for fastening aircraft assemblies comprising:
   a. A first wing clip having a single barrel and first and second ears for affixing to a first assembly, the first and second ears disposed in substantially the same plane on opposite sides of the barrel;
   b. A second wing clip having a single barrel and an ear for affixing to a second assembly; and
   c. A fastener for joining the first wing clip to the second wing clip through the barrels of the first and second wing clips.

8. The system of claim 7 wherein the first assembly is a wing rib.

9. The system of claim 7 wherein the second assembly is a wing skin stringer.

10. The system of claim 7 wherein the fastener for joining the first wing clip to the second wing clip is a bolt.

11. The system of claim 7 wherein the first and second wing clips are fastened to the assemblies using screws.

12. The system of claim 7 wherein the barrels of the first and second wing clips have complimentary mouths.

13. The system of claim 7 wherein each of the ears has an opening for receiving a fastener.

14. The system of claim 7, wherein the second wing clip comprises first and second ears disposed in substantially the same plane on opposite sides of the barrel of the second wing clip.

15. A system for fastening a first aircraft assembly to a second aircraft assembly comprising:
   a first wing clip for affixing to the first aircraft assembly, the first wing clip having a single barrel and first and second ears, wherein the first and second ears are disposed in substantially the same plane on opposite sides of the barrel;
   a second wing clip for affixing to the second aircraft assembly, the second wing clip having a single barrel and a third ear; and
   a fastener for joining the barrels of the first and second wing clips, wherein the first and second ears of the first wing clip are disposed at an angle with respect to the third ear of the second wing clip.

16. The system of claim 15, wherein the second wing clip further comprises a fourth ear disposed in substantially the same plane as the third ear, wherein the third and fourth ears are disposed on opposite sides of the barrel of the second wing clip.

17. The system of claim 15, wherein the first and second ears have openings operable to receive fasteners for affixing the first wing clip to the first aircraft assembly.

18. The system of claim 15, wherein the barrel of the first wing clip is formed with a channel.

19. The system of claim 18, wherein the barrel of the first wing clip is formed with a bolt stop adjacent the channel.

20. A wing clip for fastening aircraft assemblies comprising:
   a. An anchor plate having first and second ears adapted to be fastened to an aircraft assembly, wherein the first and second ears are disposed in substantially the same plane; and
   b. A cylindrical barrel having a wall defining a bore adapted to receive a fastener, the barrel extending the length of the anchor plate and centrally disposed between the ears and fixed to the anchor plate at shoulders adjacent to the ears.

21. The wing clip of claim 20 wherein the first and second ears are formed with contoured edges forming a radius.

22. The wing clip of claim 20 wherein the first and second ears are formed with openings for receiving a fastener.

23. The wing clip of claim 20 further comprising a tension bolt.

24. A wing clip for fastening aircraft assemblies comprising:
   a. An anchor plate having first and second ears adapted to be fastened to an aircraft assembly, wherein the first and second ears are disposed in substantially the same plane; and
   b. A cylindrical barrel having a wall defining a bore adapted to receive a fastener, the barrel extending the length of the anchor plate and centrally disposed between the ears and fixed to the anchor plate at shoulders adjacent the ears, a channel formed in a portion of the barrel to define an upper barrel and a bolt stop wherein the upper barrel is substantially longer then the bolt stop.

25. The wing clip of claim 24 wherein the first and second ears are formed with contoured edges forming a radius.

26. The wing clip of claim 24 wherein the first and second ears are formed with openings for receiving a fastener.

27. The wing clip of claim 24 further comprising a tension bolt.

* * * * *